S. A. BROOKS.
LID FOR SAUCEPANS AND THE LIKE.
APPLICATION FILED NOV. 19, 1915. RENEWED NOV. 4, 1919.
1,328,558.
Patented Jan. 20, 1920.
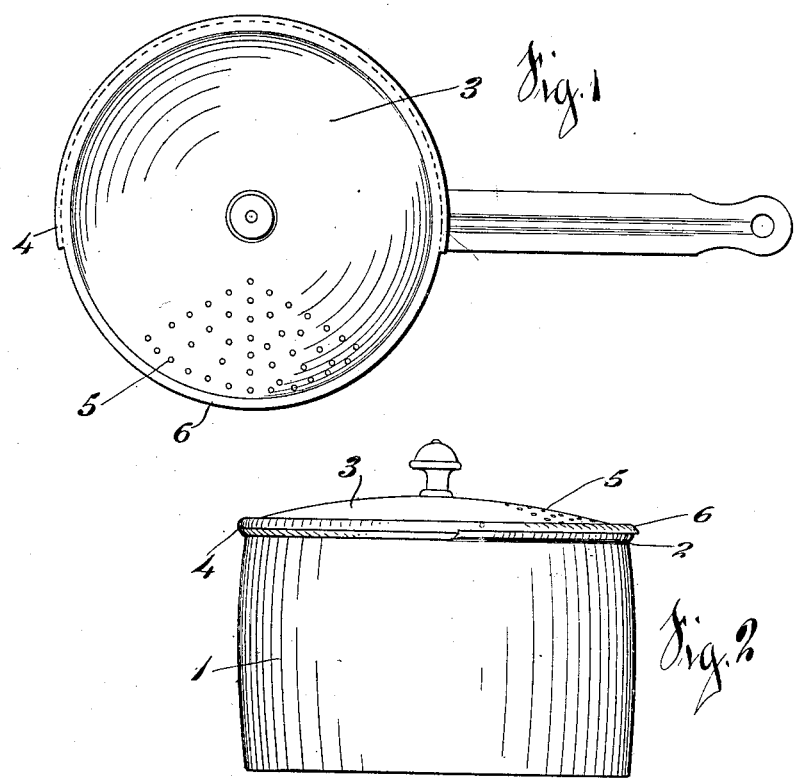
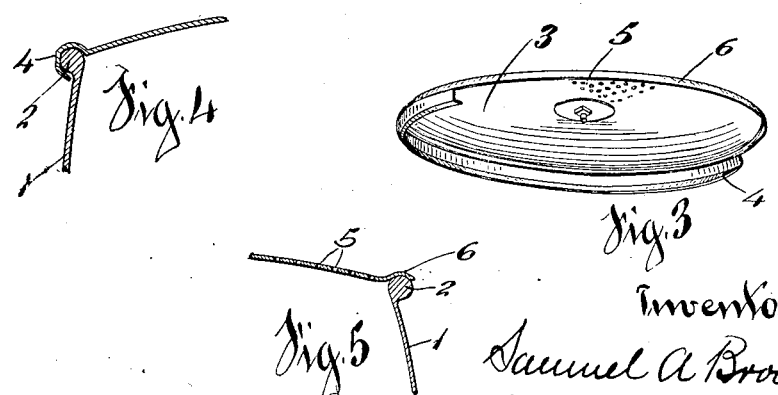
Inventor
Samuel A Brooks
by Allen & Allen
Attorneys

UNITED STATES PATENT OFFICE.

SAMUEL A. BROOKS, OF ELMWOOD PLACE, OHIO, ASSIGNOR OF ONE-HALF TO JAMES M. SHAY, OF CINCINNATI, OHIO, AND ONE-HALF TO ALFRED W. MILLER, OF ELMWOOD PLACE, OHIO.

LID FOR SAUCEPANS AND THE LIKE.

1,328,558.      Specification of Letters Patent.      Patented Jan. 20, 1920.

Application filed November 19, 1915, Serial No. 62,269. Renewed November 4, 1919. Serial No. 335,747.

*To all whom it may concern:*

Be it known that I, SAMUEL A. BROOKS, a citizen of the United States, and a resident of Elmwood Place, in the county of Hamilton and State of Ohio, have invented certain new and useful Improvements in Lids for Saucepans and the like, of which the following is a full, clear, and exact description, reference being had to the accompanying drawing, forming part of this specification.

My invention relates to lids for saucepans and the like. In the use of such pots and pans it often becomes necessary to drain off the water or other liquid from articles that are being cooked, and in doing this it is always a difficulty for the cook to hold the articles in the pot while the water is running out. Various devices have been constructed in which in connection with some special design of pot, a lid having a strainer or foraminated portion is provided, which has some special means of securing it down on the pot, It is the object of my invention to provide a lid which will serve this function for the ordinary pot or saucepan on the market today, without any special fasteners on the pot or saucepan, and without any protruding clamping arms or the like on the lid. The pots and saucepans of general use today are made up in stock sizes and are universally provided, so far as I am aware, with a bead or flange around the vessel's opening, or upper end.

The object above stated is accomplished by that certain construction and arrangement of parts to be hereinafter more specifically pointed out and claimed, wherein this bead or flange around the pot or saucepan is employed in securing the lid in place.

In the drawing,

Figure 1 is a top plan view of the lid and saucepan.

Fig. 2 is an elevation lengthwise of the handle.

Fig. 3 is a perspective view of the lid.

Figs. 4 and 5 are detail sections showing the engagement of the lid with the bead on the saucepan.

1 is any pot or saucepan, having the bead 2 around its open end. These pots and pans come in regular stock sizes, and it is designed to make up the lids in various sizes to fit the stock size pots and pans.

The lid is provided also of stock sizes and has a main portion 3 of suitable metal and of a size to cover the desired size of pot. A depending resilient flange 4 is provided extending slightly more than half way around the edge of the main portion of the lid, and this flange is curved inwardly for its lower edge so as to engage over the bead 2 on the desired pot.

The lid is foraminated at 5, on the unflanged portion thereof, and this unflanged portion is made large enough to lap or extend over the bead and the edge of the unflanged portion is slightly turned down at 6 so as to partially snap over the bead 2 on the pot.

In mounting the lid on the pot, it is slid on with the depending flange set over the bead 2. The natural resiliency of the flange portion 4 is such that in sliding the lid into place laterally, the flange 4 at its forward portions springs outwardly to allow the flange to pass along and over the bead 2 at the full diameter of the vessel, and as soon as it has passed this portion, the flange springs back and firmly grasps the bead. The unflanged portion will also snap over the bead because of the slightly turned down portion thereof at 6.

As so mounted, the lid will hold firmly in place if the pot is inverted so that the contents thereof rest against the lid, and when so inverted the water in the pot will drain off through the foraminated portion of the lid, which acts as a strainer.

It will be noted that there is no part on the lid which has to be manually adjusted in order to engage the bead on the pot. The lid is merely slid on and off without any difficulty or adjustment of parts.

Having thus described my invention, what I claim as new and desire to secure by Letters Patent, is:—

1. The combination with a pan having a peripheral bead around the opening thereof, of a lid for said pan having a body portion to cover the opening of the said pan, and a flange depending from said body portion and inturned so as to engage around said bead, said inturned portion extending slightly more than half way and less than the entire way around said body portion.

2. The combination with a pan having a peripheral bead around the opening thereof, of a lid for said pan having a body portion to cover the opening of the said pan, and a flange depending from said body portion and inturned so as to engage around said bead, said inturned portion extending slightly more than half way and less than the entire way around said body portion, said body portion having a foraminated section therein on the side opposite the inturned flange.

SAMUEL A. BROOKS.